US007973669B2

(12) United States Patent
Pham et al.

(10) Patent No.: US 7,973,669 B2
(45) Date of Patent: Jul. 5, 2011

(54) APPARATUS AND METHOD FOR WIRELESS LOCATION SENSING

(75) Inventors: Hai D. Pham, Eden Prairie, MN (US); Steve D. Huseth, Plymouth, MN (US); Andrew G. Berezowski, Wallingford, CT (US); Thomas J. Schubring, Stillwater, MN (US); Edward J. Dauskurdas, Geneva, IL (US); Dan Hawkinson, Elburn, IL (US); Kalvin Watson, Chicago, IL (US); Edward J. Kurtz, Saint Charles, IL (US); David J. Wunderlin, New Hope, MN (US)

(73) Assignee: Honeywell International Inc., Morristown, NJ (US)

( * ) Notice: Subject to any disclaimer, the term of this patent is extended or adjusted under 35 U.S.C. 154(b) by 667 days.

(21) Appl. No.: 11/895,168

(22) Filed: Aug. 23, 2007

(65) Prior Publication Data

US 2009/0051551 A1 Feb. 26, 2009

(51) Int. Cl.
*G08B 17/10* (2006.01)
*H04M 11/04* (2006.01)

(52) U.S. Cl. ..... 340/628; 340/629; 340/630; 340/693.6; 340/693.11; 379/43; 379/45; 379/106.01

(58) Field of Classification Search .................. 340/628, 340/629, 630, 693, 693.11; 379/43, 45, 106.01
See application file for complete search history.

(56) References Cited

U.S. PATENT DOCUMENTS

| | | | | |
|---|---|---|---|---|
| 4,845,474 | A * | 7/1989 | Moore et al. | 340/629 |
| 5,889,468 | A * | 3/1999 | Banga | 340/628 |
| 6,633,231 | B1 * | 10/2003 | Okamoto et al. | 340/539.11 |
| 6,914,533 | B2 * | 7/2005 | Petite | 340/628 |
| 7,567,174 | B2 * | 7/2009 | Woodard et al. | 340/539.26 |
| 2007/0132577 | A1 | 6/2007 | Kolavennu | |

FOREIGN PATENT DOCUMENTS

WO WO 98/10307 A1 3/1998

OTHER PUBLICATIONS

Amer Catovic et al., "Hybrid TOA/RSS and TDOA/RSS Location Estimating Schemes for Short-Range Wireless Networks", Bechtel Telecommunication Technical Journal, Sep. 2004, vol. 2, No. 2, 8 pages.

(Continued)

*Primary Examiner* — Daniel Wu
*Assistant Examiner* — Mark Rushing
(74) *Attorney, Agent, or Firm* — Munck Carter, LLP

(57) ABSTRACT

A sensor assembly includes a sensor configured to detect at least one material or condition, such as a smoke detector, fire detector, or carbon monoxide detector. The sensor assembly also includes a base configured to be mounted on a structure, such as a wall or ceiling, and to receive the sensor. The sensor assembly further includes a wireless module located between the sensor and the base. The wireless module is configured to transmit position information. The wireless module may include one or more electrical contacts used to form at least one electrical connection between the base of the sensor assembly and the sensor. The wireless module may also include a printed circuit board having the contacts, wireless radio circuitry, an antenna, and other components. The printed circuit board could be substantially hidden from view when the sensor is attached to the base and the base is mounted on the structure.

20 Claims, 4 Drawing Sheets

OTHER PUBLICATIONS

Kaveh Pahlavan et al., "Indoor Geolocation Science and Technology", IEEE Communications Magazine, Feb. 2002, pp. 112-118.
K. W. Cheung et al., "Least Squares Algorithms for Time-of-Arrival-Based Mobile Location", IEEE Transactions on Signal Processing, vol. 52, No. 4, Apr. 2004, pp. 1121-1128.
Jose A. Costa et al., "Achieving High-Accuracy Distributed Localization in Sensor Networks", 2005 IEEE, pp. 641-644.
Muzaffer Kanaan et al., "A comparison of wireless geolocation algorithms in the indoor environment", IEEE Communications Society, 2004, pp. 177-182.
"Notification of Transmittal of the International Search Report and the Written Opinion of the International Searching Authority, or the Declaration" issued in PCT Application No. PCT/US2006/046750 dated Jun. 20, 2007.

* cited by examiner

APPARATUS AND METHOD FOR WIRELESS LOCATION SENSING

TECHNICAL FIELD

This disclosure relates generally to smoke and other detection systems and more specifically to an apparatus and method for wireless location sensing.

BACKGROUND

Smoke, carbon monoxide, and other detection systems are routinely used in residential homes, commercial buildings, and other structures. These detection systems routinely include sensors, such as smoke or carbon monoxide detectors, distributed throughout a structure. The sensors operate to detect smoke, carbon monoxide, or other materials or conditions. The sensors are often coupled to a central controller by electrical connections. Based on electrical signals received from the sensors, the central controller determines if and when to activate an alarm (such as an audible alarm), notify appropriate personnel (such as a fire department or an alarm monitoring company), or activate a fire-suppression or other system (such as a sprinkler system).

Each of the sensors distributed in a residential, commercial, or other structure typically contains sensing components used to detect smoke, carbon monoxide, or other materials or conditions. Each of the sensors is also typically attached to a base, which is often attached to a wall or ceiling of the structure to secure the sensor in place. In addition, each of the sensors may further include a mechanism for setting a network address or other identifier associated with the sensor. This may allow the central controller to determine the location of a problem reported by one or more of the sensors.

SUMMARY

This disclosure provides an apparatus and method for wireless location sensing.

In a first embodiment, a sensor assembly includes a sensor configured to detect at least one material or condition. The sensor assembly also includes a base configured to be mounted on a structure and to receive the sensor. In addition, the sensor assembly includes a wireless module between the sensor and the base. The wireless module is configured to transmit position information.

In particular embodiments, the base includes one or more first electrical contacts, and the wireless module includes one or more second electrical contacts. The one or more second electrical contacts are configured to contact the one or more first electrical contacts to form one or more electrical connections between the one or more first electrical contacts and the sensor.

In other particular embodiments, the wireless module is configured to receive operating power through at least one of the one or more second electrical contacts.

In yet other particular embodiments, the wireless module includes a printed circuit board. The printed circuit board includes wireless radio circuitry and the one or more second electrical contacts. The wireless module may also include a protective cover placed over the wireless module between the wireless module and the base.

In still other particular embodiments, the wireless module is sized to fit within the sensor and is substantially hidden from view when the sensor is attached to the base and the base is mounted on the structure.

In additional particular embodiments, the sensor includes a smoke detector, a fire detector, and/or a carbon monoxide detector, and the structure includes a wall or a ceiling.

In a second embodiment, a wireless module includes a printed circuit board. The printed circuit board includes a wireless radio configured to provide position information, an antenna configured to transmit the position information, and a power supply configured to provide power to the wireless radio. The printed circuit board is sized and configured to be inserted between a sensor and a base. The sensor is configured to detect at least one material or condition, and the base is configured to be mounted on a structure and to receive the sensor.

In a third embodiment, a method includes attaching a wireless module to a sensor, where the sensor is configured to detect at least one material or condition. The method also includes attaching the sensor to a base, where the base is mounted on a structure. The method further includes providing power to the wireless module through the base and providing power to the sensor through the wireless module. In addition, the method includes wirelessly transmitting position information using the wireless module.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
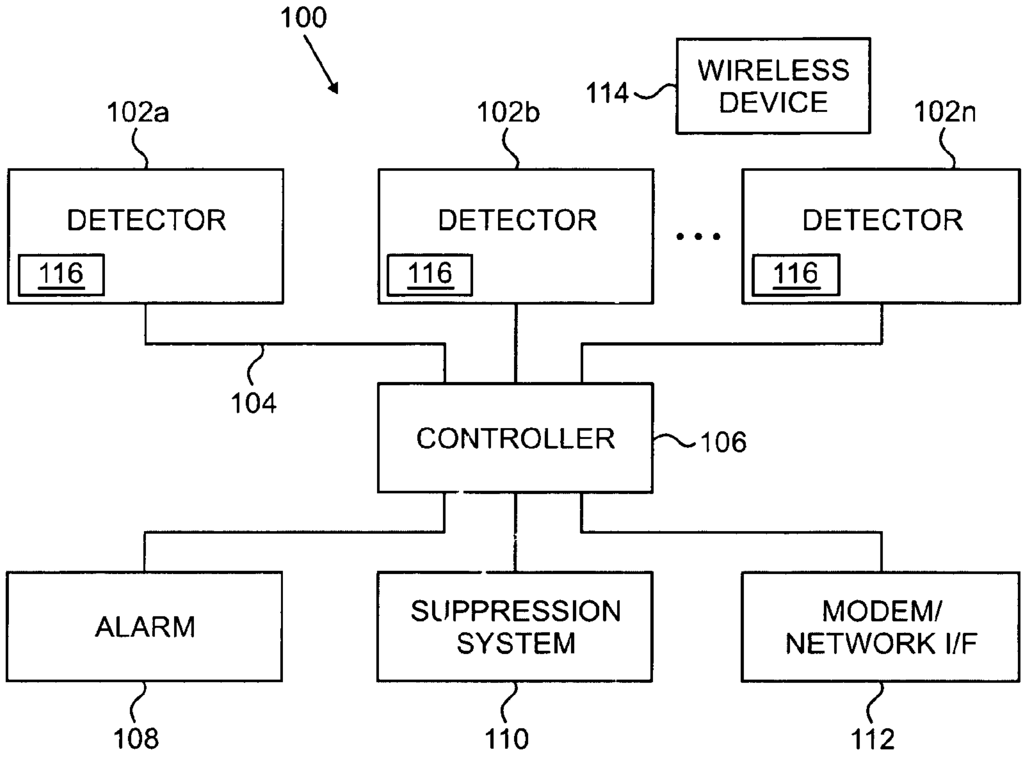
FIG. 1 illustrates an example detection system according to one embodiment of this disclosure.

FIG. 1 illustrates an example detection system 100 according to one embodiment of this disclosure. The embodiment of the detection system 100 shown in FIG. 1 is for illustration only. Other embodiments of the detection system 100 could be used without departing from the scope of this disclosure.

In this example, the detection system 100 is used to detect the presence of one or more materials or conditions in a specified area. For example, the detection system 100 could be used to detect smoke, fire, carbon monoxide, or other material(s) or condition(s) in a residential, commercial, or other structure.

In this example embodiment, the detection system 100 includes multiple sensors 102*a*-102n distributed throughout a specified area. The sensors 102*a*-102*n* operate to detect the one or more materials or conditions in the specified area. If a sensor detects at least one of these materials or conditions, the sensor can generate and communicate a signal over an electrical network 104. Each of the sensors 102*a*-102*n* includes any suitable structure for detecting one or more materials or conditions. Each of the sensors 102*a*-102*n* could, for example, include a smoke detector, heat detector, carbon monoxide detector, or other suitable sensor.

The electrical network 104 represents a transmission medium for transporting signals from the sensors 102*a*-102*n* to a controller 106. The electrical network 104 could also be used to supply operating power to the sensors 102*a*-102*n*. The electrical network 104 could, for example, represent electrical wires coupling each sensor 102*a*-102*n* to the controller 106. However, any other suitable network or other transmission medium could be used. For instance, a wired or wireless communication network, such as an Ethernet network, could be used. As a particular example, the electrical network 104 could represent a wired Signaling Line Circuit (SLC) bus.

The controller 106 is coupled to or in communication with the sensors 102*a*-102*n*. The controller 106 is configured to receive signals from the sensors 102*a*-102*n* and to determine if and when one or more materials or conditions are detected by any of the sensors 102*a*-102*n*. If so, the controller 106 can take any suitable action. For example, the controller 106 could activate one or more alarms 108, activate one or more suppression systems 110, or notify the appropriate system or personnel using one or more modems/network interfaces 112. The controller 106 includes any suitable structure for monitoring signals from one or more sensors and taking appropriate action when one or more materials or conditions are detected.

The one or more alarms 108 represent any suitable structures for notifying people about one or more detected materials or conditions. The alarms 108 could, for example, include sirens, flashing lights, or any other audible or visual notification devices. The one or more suppression systems 110 represent any suitable structures for suppressing or extinguishing fires or otherwise reducing or eliminating one or more conditions, such as a sprinkler system or halon fire suppression system. The one or more modems/network interfaces 112 represent any suitable structures for facilitating communication with external devices, systems, or personnel. The modems/network interfaces 112 could, for example, represent a modem (such as a digital subscriber line, cable, or other modem) capable of communicating over a communication link (such as a telephone line, coaxial cable, or fiber optic link). As a particular example, the modems/network interfaces 112 could allow the controller 106 to notify a security monitoring company or a fire department.

In one aspect of operation, one or more of the sensors 102*a*-102*n* include a wireless radio module 116, which can be used to support location sensing within a specified area. For example, each of the sensors 102*a*-102*n* could include a radio frequency (RF) module that transmits position information, such as position information unique to that particular sensor. This position information could be received by wireless devices 114, such as RF receivers. Among other things, this allows personnel, such as firefighters, to carry wireless devices 114 that can be used to help identify the locations of the personnel in the specified area.

The wireless radio module 116 includes any suitable structure for facilitating wireless communications to support location sensing. As described in more detail below, the wireless radio module 116 could represent a thin detachable module that can be placed between a sensor 102*a*-102*n* and its associated base. This may, for example, permit the upgrading or retrofitting of existing smoke detectors and other sensors that have already been manufactured and deployed. This may also help to hide the wireless radio module 116 from view and avoid the need to add large or visible components to the sensors.

Although FIG. 1 illustrates one example of a detection system 100, various changes may be made to FIG. 1. For example, the functional division in FIG. 1 is for illustration only. Various components in FIG. 1 could be combined or omitted and additional components could be added according to particular needs.

Figure 2:
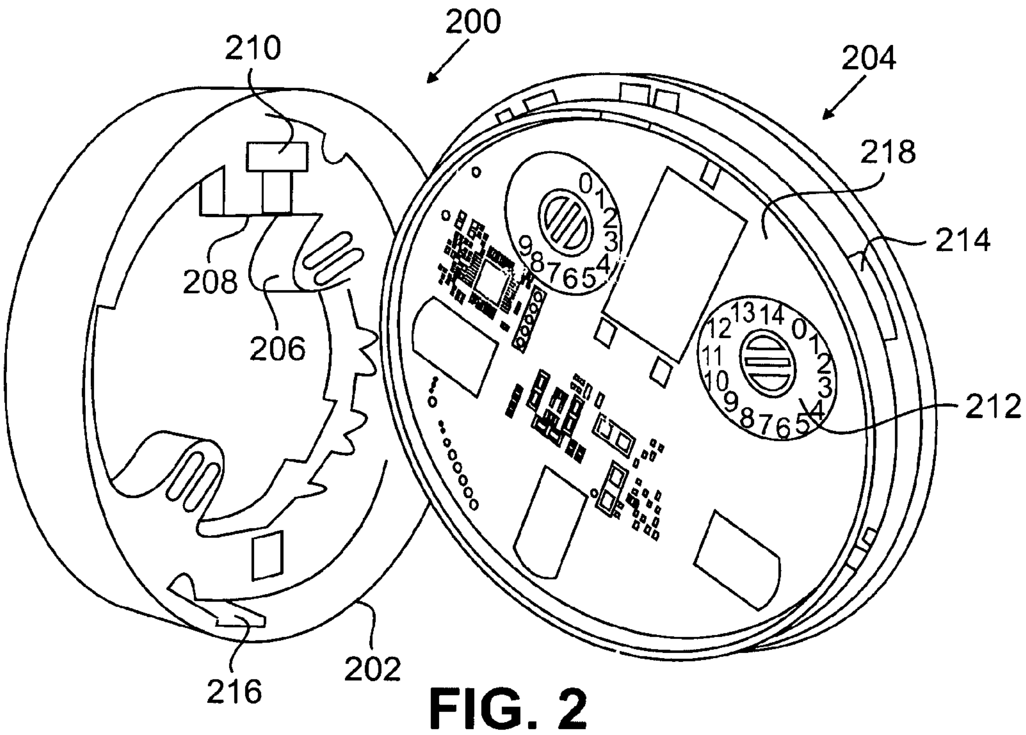
FIG. 2 illustrates an example sensor assembly according to one embodiment of this disclosure.

FIG. 2 illustrates an example sensor assembly 200 according to one embodiment of this disclosure. The embodiment of the sensor assembly 200 shown in FIG. 2 is for illustration only. Other embodiments of the sensor assembly 200 could be used without departing from the scope of this disclosure. Also, for ease of explanation, the sensor assembly 200 is described as representing the sensors 102*a*-102*n* in the system 100 of FIG. 1, although the sensor assembly 200 could be used in any other suitable system.

As shown in FIG. 2, the sensor assembly 200 includes a base 202 and a sensor 204. The base 202 generally represents a component that can be secured to a wall, ceiling, or other location and that can receive and hold the sensor 204. In this way, the base 202 allows the sensor 204 to be mounted in a suitable location in a residential, commercial, or other structure.

As shown here, the base 202 includes various components used to secure the base 202 to a structure, to form electrical connections with one or more wires (such as wires in the electrical network 104), and to receive and retain the sensor 204. For example, the base 202 includes connection points 206, which represent areas where screws, pins, or other attachment means can be used to connect or secure the base 202 to a wall, ceiling, or other structure. The base 202 also includes electrical connections 208, such as screw-type connections, that can be coupled to wires in the electrical network 104. The base 202 further includes electrical contacts 210, which can make contact with the sensor 204 and form an electrical connection between the sensor 204 and the wires in the electrical network 104.

The sensor 204 includes or houses various sensing components used to detect smoke, fire, carbon monoxide, or other materials or conditions. The sensor 204 may also include various other components, such as an audible or visual indicator, a battery or backup power supply, or other components. In this example, these components are encased in the sensor 204 and are hidden from view. The sensor 204 also includes dial switches 212, which can be used to set the network address or other identifier associated with the sensor 204. In addition, the base 202 and the sensor 204 include components for attaching the sensor 204 to the base 202, such as tabs 214 on the sensor 204 that can be inserted into slots 216 of the base 202.

In this example embodiment, a wireless radio module 218 is inserted into the sensor 204 and is held between the sensor 204 and the base 202. As described in more detail below, the wireless radio module 218 supports location sensing applications, such as by transmitting an identifier associated with a particular location or by transmitting other position information. This position information can be received by a device, such as an RF receiver, and used to identify a position of the device.

As shown in this example, the wireless radio module 218 is thin and can be inserted between the sensor 204 and the base 202. For instance, the wireless radio module 218 can be inserted into the sensor 204 and reside completely inside the sensor 204 (such as within the outer rim of the sensor 204). As a result, the wireless radio module 218 can be placed within existing smoke detectors and other sensors, thereby upgrading or retrofitting the sensors to support wireless location sensing applications. Moreover, by placing the wireless radio module 218 between the sensor 204 and the base 202, the wireless radio module 218 is protected and hidden from sight. This may avoid problems related to existing and deployed smoke detectors and other sensors, such as by eliminating the need to color match a plastic cover for the wireless radio module 218 with the plastic forming the base 202 and encasing the sensor 204.

Although FIG. 2 illustrates one example of a sensor assembly 200, various changes may be made to FIG. 2. For example, the structure of the base 202 is for illustration only. The base 202 could have any other suitable structure to support the particular functions of the base 202. Also, any other suitable mechanism could be used to set the network address or other identifier of the sensor assembly 200, and any other suitable mechanism could be used to couple the base 202 to the sensor 204. In addition, the shape, size, and configuration of the sensor assembly 200 are for illustration only.

Figure 3A:
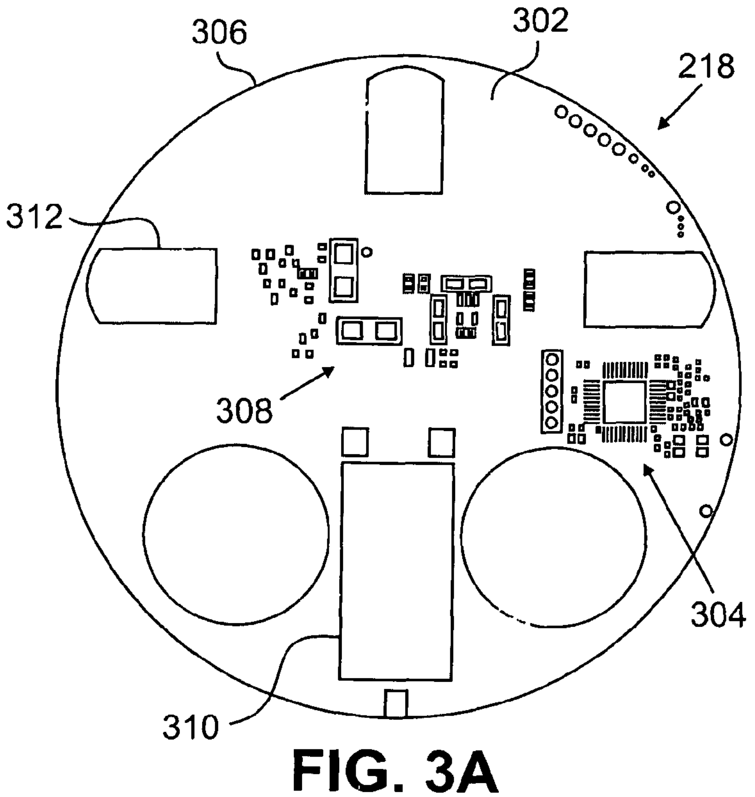
FIGS. 3A and 3B illustrate an example wireless radio module for a sensor according to one embodiment of this disclosure.
Figure 3B:
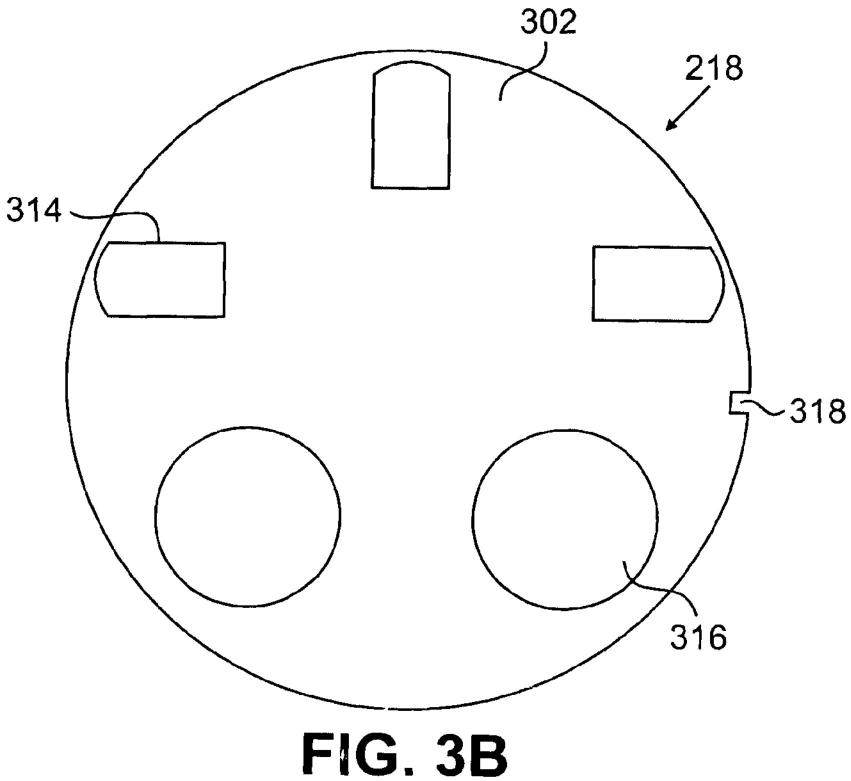

FIGS. 3A and 3B illustrate an example wireless radio module 218 for a sensor according to one embodiment of this disclosure. The embodiment of the wireless radio module 218 shown in FIGS. 3A and 3B is for illustration only. Other embodiments of the wireless radio module 218 could be used without departing from the scope of this disclosure.

As shown in FIG. 3A, the wireless radio module 218 includes a printed circuit board 302. The printed circuit board 302 carries the various electronic components implementing the functions of the wireless radio module 218. The printed circuit board 302 represents any suitable board, substrate, or other carrier for supporting the electronic components of the wireless radio module 218. Although shown as circular, the printed circuit board 302 could have any other suitable size or shape, such as a 2.67-inch by 2.67-inch square board or other board that can fit inside a smoke detector or other sensor.

In this example, the printed circuit board 302 carries various circuitry implementing the functions of the wireless radio module 218. For example, wireless radio circuitry 304 may represent the circuitry used to generate a wireless signal, which can be transmitted by an antenna 306. The wireless radio circuitry 304 and the antenna 306 could facilitate wireless communications using any suitable wireless signals, such as RF signals. The wireless radio circuitry 304 includes any suitable circuitry for facilitating wireless communications, such as an RF transmitter. As a particular example, the wireless radio circuitry 304 could include a 2.4 GHz IEEE 802.15.4 radio module, such as the CC2430 radio module from TEXAS INSTRUMENTS. The antenna 306 could represent any suitable structure for transmitting wireless signals, such as a "inverted F" antenna or a loop antenna.

The printed circuit board 302 also carries power supply logic 308 and a capacitor 310. The power supply logic 308 is configured to charge the capacitor 310, such as by using an external voltage received over the electrical network 104. The power supply logic 308 is also configured to provide power to various other components in the wireless radio module 218, such as the wireless radio circuitry 304. The power supply logic 308 includes any suitable circuitry for controlling the supply of power in the wireless radio module 218. The capacitor 310 includes any suitable capacitor for storing a charge, such as a flat supercapacitor.

In this example, one side of the printed circuit board 302 includes base contacts 312, and another side of the printed circuit board 302 includes sensor contacts 314. The base contacts 312 are used to form electrical connections with the electrical contacts 210 in the base 202 of the sensor assembly 200. Similarly, the sensor contacts 314 are used to form electrical connections with electrical contacts in the sensor 204 of the sensor assembly 200. The base contacts 312 are also in electrical connection with the corresponding sensor contacts 314. In this way, electrical signals can be sent from the sensor 204 through the wireless radio module 218 to the base 202 and vice versa. This allows electrical connection between, for example, the controller 106 and the sensors 102*a*-102*n* to be maintained even when wireless radio modules are inserted into the sensors 102*a*-102*n*. Moreover, at least one of the contacts could be used to provide power to the power supply logic 308 and capacitor 310. Each of the contacts 312-314 includes any suitable structure capable of forming an electrical connection between the wireless radio module 218 and another device, system, or transmission medium.

As shown here, the wireless radio module 218 includes two holes 316. These holes 316 allow the dial switches 212 of the sensor 204 to be visible and accessible through the wireless radio module 218. The holes 316 in the wireless radio module 218 could, however, be omitted, which may be useful if the network address or other identifier associated with the sensor assembly 200 is set in other ways. Also, the wireless radio module 218 includes a notch 318. The notch 318, along with the holes 316, could be used to ensure proper alignment of the wireless radio module 218 with the sensor 204 of the sensor assembly 200. However, any other suitable alignment mechanism could be used with the wireless radio module 218.

Although FIGS. 3A and 3B illustrate one example of a wireless radio module 218 for a sensor, various changes may be made to FIGS. 3A and 3B. For example, the functions implemented on the printed circuit board 302 could be implemented in any other suitable manner, such as by using an Application Specific Integrated Circuit (ASIC). Also, the circuitry on the printed circuit board 302 could be powered in any other suitable manner. Further, the wireless radio module 218 could have any other suitable size, shape, or arrangement. Beyond that, the positions, size, and shape of the contacts 312-314 are for illustration only. The contacts 312-314 could have any other suitable size or shape, and the wireless radio module 218 could include any suitable number of contacts 312-314. In addition, the above description has described the use of the wireless radio module 218 to transmit position information to wireless devices (such as wireless device 114) located at or near the sensor assembly 200. In other embodiments, the wireless radio module 218 could receive information from devices (such as RF tags) at or near the sensor assembly 200. In these embodiments, the wireless radio circuitry 304 could receive position information, and additional circuitry could be added to communicate the position information over the electrical network 104 or other communication network. In other words, the wireless radio module 218 could support transmission and/or reception of position information to support location sensing.

Figure 4A:
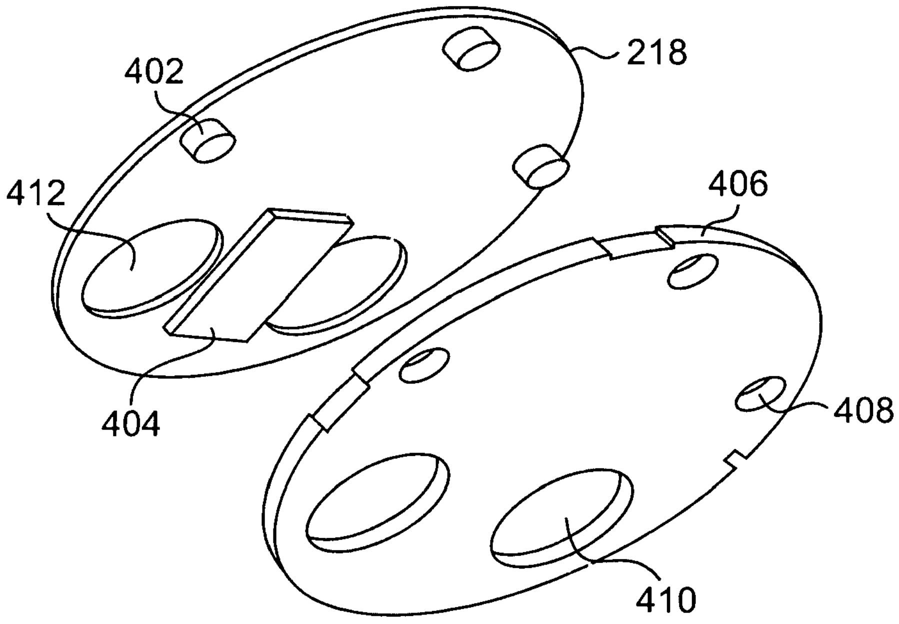
FIGS. 4A through 4C illustrate additional details of an example wireless radio module for a sensor according to one embodiment of this disclosure.
Figure 4B:
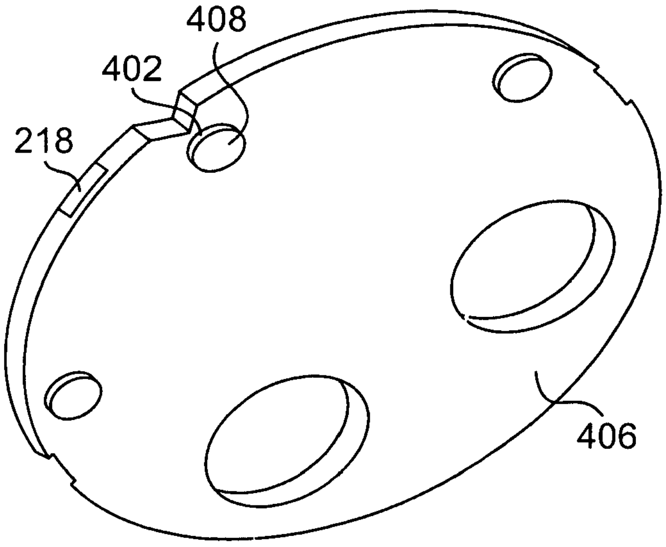
Figure 4C:
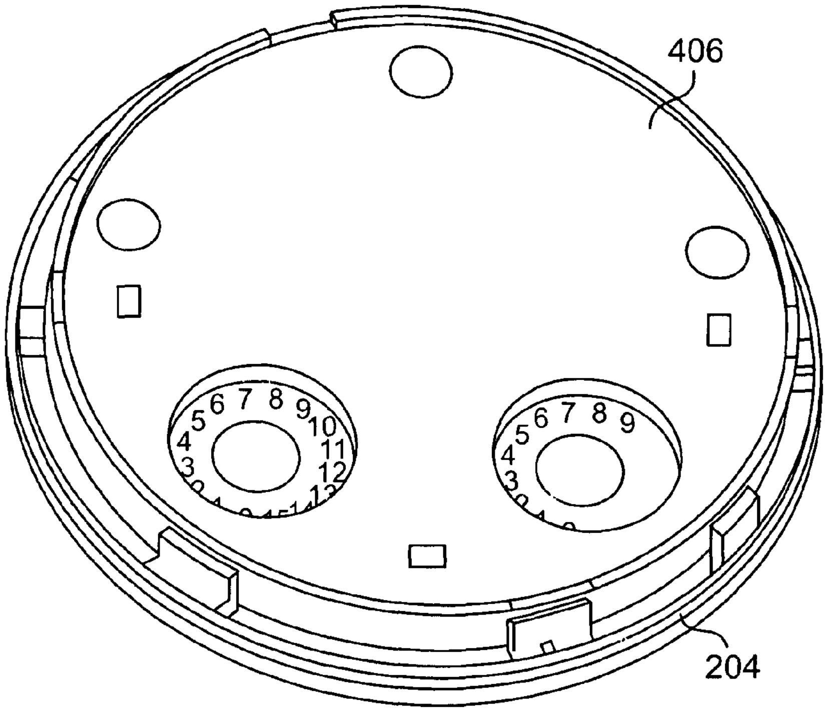

FIGS. 4A through 4C illustrate additional details of an example wireless radio module for a sensor according to one embodiment of this disclosure. The additional details shown in FIGS. 4A through 4C are for illustration only. Other embodiments of the wireless radio module could be used without departing from the scope of this disclosure.

As shown in FIG. 4A, the wireless radio module 218 includes contacts 402 and a capacitor 404. These may be the same as or similar to the corresponding elements in FIG. 3A, although the contacts 402 have a different size and shape (namely, they are cylindrical and thicker and rise from the surface of the wireless radio module 218). In this example, the wireless radio module 218 also includes a protective cover 406. The protective cover 406 generally fits over the wireless radio module 218. For instance, as shown in FIGS. 4A and 4B, the protective cover 406 includes holes 408, through which the contacts 402 of the wireless radio module 218 can be inserted. The protective cover 406 also includes holes 410, which can be aligned with holes 412 in the wireless radio module 218. As shown in FIG. 4C, the wireless radio module 218 and the protective cover 406 can be inserted into the sensor 204 of the sensor assembly 200. The protective cover 406 covers the wireless radio module 218, thereby encapsulating the wireless radio module 218 and providing protection to the wireless radio module 218.

In this example, the contacts 402 of the wireless radio module 218 are raised or thicker than those shown in FIGS. 3A and 3B. This allows the contacts 402 to be inserted into the holes 408 of the protective cover 406. In this example, this allows the contacts 402 to be generally planar with the exposed surface of the protective cover 406 after insertion into the sensor 204. In this way, the contacts 402 may still form electrical connections with the contacts 210 in the base 202 of the sensor assembly 200.

Although FIGS. 4A through 4C illustrate additional details of one example of a wireless radio module for a detection system sensor, various changes may be made to FIGS. 4A through 4C. For example, the wireless radio module 218 and the protective cover 406 could have any other suitable size or shape. Also, any other or additional structure or technique could be used to provide protection to the wireless radio module 218. In addition, various features of the wireless radio module 218 shown in one figure could be used in another figure (such as when the circular contacts from FIGS. 4A through 4C are used in FIGS. 3A and 3B).

Figure 5:
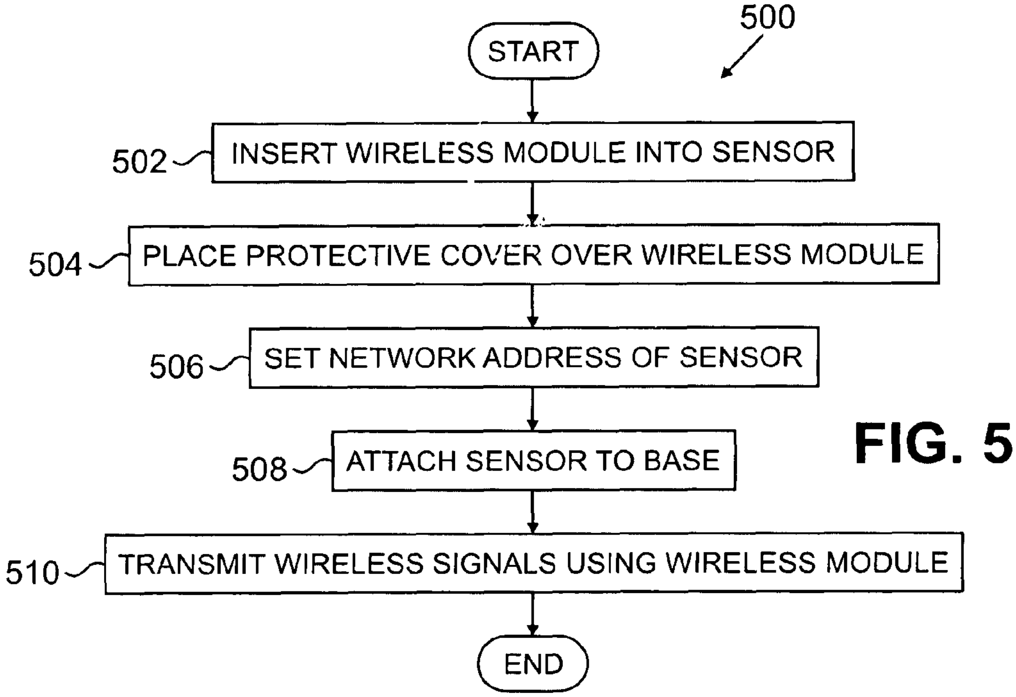
FIG. 5 illustrates an example method for wireless location sensing using a wireless radio module in a sensor according to one embodiment of this disclosure.

FIG. 5 illustrates an example method 500 for wireless location sensing using a wireless radio module in a sensor according to one embodiment of this disclosure. The embodiment of the method 500 shown in FIG. 5 is for illustration only. Other embodiments of the method 500 could be used without departing from the scope of this disclosure.

A wireless radio module is inserted into a smoke detector or other sensor at step 502. This could include, for example, inserting the wireless radio module 218 into the sensor 204 of the sensor assembly 200. A notch 318 and holes 316 in the wireless radio module 218 could be used to align the wireless radio module 218 in the sensor 204. The wireless radio module 218 could be permanently or temporarily inserted into the sensor 204 of the sensor assembly 200.

A protective cover is placed over the wireless radio module at step 504. This could include, for example, placing the protective cover 406 over the wireless radio module 218 so that the base contacts of the wireless radio module 218 remain exposed (for later contact with connections on the base 202 of the sensor assembly 200).

A network address or other identifier associated with the sensor is set at step 506. This could include, for example, using the dial switches 212 to set the network address or other identifier of the sensor assembly 200. The dial switches 212 could be adjusted so that the sensor assembly 200 has a unique address in the detection system 100.

The sensor is attached to the base of the sensor assembly at step 508. This could include, for example, inserting the sensor 204 of the sensor assembly 200 into the base 202 of the sensor assembly 200. Any suitable mechanism(s) could be used to secure the sensor 204 to the base 202. During this step, the exposed base contacts of the wireless radio module 218 could make contact with the electrical connections 208 in the base 202 of the sensor assembly 200. This allows the sensor 204 of the sensor assembly 200 to communicate over the electrical network 104 and possibly receive power over the electrical network 104. This may also allow the wireless radio module 218 to draw power from and to operate using power received over the electrical network 104.

A wireless signal is transmitted using the wireless radio module at step 510. This could include, for example, the wireless radio module 218 broadcasting an RF signal containing position information. The position information could, for example, include an identifier identifying the location associated with the sensor assembly 200. However, any other suitable position information could be transmitted by the wireless radio module 218. The position information could also be transmitted at any suitable interval, such as once every second.

Although FIG. 5 illustrates one example of a method 500 for wireless location sensing using a wireless radio module in a detection system sensor, various changes may be made to FIG. 5. For example, while shown as a series of steps, various steps in FIG. 5 could overlap, occur in parallel, or occur in a different order. Also, the above description has described the use of the wireless radio module 218 to transmit position information to RF or other receivers located at or near the sensor assembly 200. In addition or alternatively, as described above, the wireless radio module 218 could receive information from devices (such as RF tags) at or near the sensor assembly 200 and forward the information.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of the invention, as defined by the following claims.

What is claimed is:

1. A sensor assembly comprising:

a sensor configured to detect at least one material or condition, the sensor comprising one or more first electrical contacts;

a base configured to be mounted on a structure and to receive the sensor, the base comprising one or more second electrical contacts; and a wireless module between the sensor and the base, the wireless module configured to transmit position information, the wireless module comprising one or more third electrical contacts;

wherein:

the one or more first electrical contacts are configured to physically contact and form one or more electrical connections with the one or more second electrical contacts when the sensor is attached to the base without the wireless module; and the one or more third electrical contacts are configured to form electrical connections with both the first and second electrical contacts when the sensor is attached to the base with the wireless module between the base and the sensor, the wireless module configured to be physically positioned between the first and second electrical contacts and to prevent the one or more first electrical contacts from physically contacting the one or more second electrical contacts.

2. The sensor assembly of claim 1, wherein the wireless module is configured to receive operating power through at least one of the one or more third electrical contacts.

3. The sensor assembly of claim 1, wherein the wireless module comprises a printed circuit board, the printed circuit board comprising wireless radio circuitry and the one or more third electrical contacts.

4. The sensor assembly of claim 3, further comprising:

a protective cover placed over the wireless module between the wireless module and the base.

5. The sensor assembly of claim 4, wherein:

the protective cover includes one or more holes; and at least one of the one or more third electrical contacts fits through the one or more holes so as to make contact with the one or more second electrical contacts of the base.

6. The sensor assembly of claim 3, wherein the printed circuit board further comprises a capacitor configured to store a charge used to power the wireless module.

7. The sensor assembly of claim 3, wherein the printed circuit board further comprises an antenna configured to transmit the position information.

8. The sensor assembly of claim 1, wherein the wireless module is sized to fit within the sensor and is substantially hidden from view when the sensor is attached to the base and the base is mounted on the structure.

9. The sensor assembly of claim 1, wherein:

the sensor comprises at least one of: a smoke detector, a fire detector, and a carbon monoxide detector; and the structure comprises a wall or a ceiling.

10. A wireless module comprising a printed circuit board, the printed circuit board comprising:

a wireless radio configured to provide position information;

an antenna configured to transmit the position information; and a power supply configured to provide power to the wireless radio;

wherein:

the printed circuit board is sized and configured to be inserted between a sensor and a base, the sensor comprising one or more first electrical contacts and configured to detect at least one material or condition, the base comprising one or more second electrical contacts and configured to be mounted on a structure and to receive the sensor, the wireless module further comprising one or more third electrical contacts;

the one or more first electrical contacts are configured to physically contact and form one or more electrical connections with the one or more second electrical contacts when the sensor is attached to the base without the wireless module; and the one or more third electrical contacts are configured to form electrical connections with both the first and second electrical contacts when the sensor is attached to the base with the wireless module between the base and the sensor, the wireless module configured to be physically positioned between the first and second electrical contacts and to prevent the one or more first electrical contacts from physically contacting the one or more second electrical contacts.

11. The wireless module of claim 10, wherein the power supply is configured to receive the power for the wireless module through at least one of the one or more third electrical contacts.

12. The wireless module of claim 10, further comprising:

a protective cover placed over at least one surface of the printed circuit board.

13. The wireless module of claim 12, wherein:

the protective cover includes one or more holes; and at least one of the one or more third electrical contacts fits through the one or more holes so as to make contact with the one or more second electrical contacts of the base.

14. The wireless module of claim 10, wherein the wireless module is sized to fit within the sensor and is substantially hidden from view when the sensor is attached to the base and the base is mounted on the structure.

15. The wireless module of claim 10, wherein:

the sensor comprises at least one of: a smoke detector, a fire detector, and a carbon monoxide detector; and the structure comprises a wall or ceiling.

16. A method comprising:

attaching a wireless module to a sensor, the sensor comprising one or more first electrical contacts and configured to detect at least one material or condition;

attaching the sensor to a base, the base comprising one or more second electrical contacts and mounted on a structure, the wireless module comprising one or more third electrical contacts;

forming electrical connections between the first and third electrical contacts and between the second and third electrical contacts when the sensor is attached to the base with the wireless module between the base and the sensor;

providing power to the wireless module through the one or more second electrical contacts;

providing power to the sensor through the one or more third electrical contacts; and wirelessly transmitting position information using the wireless module;

wherein the one or more first electrical contacts are configured to physically contact and form one or more electrical connections with the one or more second electrical contacts when the sensor is attached to the base without the wireless module, and the wireless module is configured to be physically positioned between the first and second electrical contacts and thereby prevent the one or more first electrical contacts from physically contacting the one or more second electrical contacts.

17. The method of claim 16, wherein:

the sensor comprises at least one of: a smoke detector, a fire detector, and a carbon monoxide detector; and the structure comprises a wall or ceiling.

18. The sensor assembly of claim 1, wherein:

the wireless module has a first side and a second side and multiple third electrical contacts;

the first side is configured to be adjacent to the sensor and the second side is configured to be adjacent to the base when the wireless module is positioned between the base and the sensor;

a first subset of the third electrical contacts is located on the first side of the wireless module and configured to form one or more first electrical connections with the one or more first electrical contacts; and a second subset of the third electrical contacts is located on the second side of the wireless module and configured to form one or more second electrical connections with the one or more second electrical contacts.

19. The wireless module of claim 10, wherein:

the wireless module has a first side and a second side and multiple third electrical contacts;

the first side is configured to be adjacent to the sensor and the second side is configured to be adjacent to the base when the wireless module is positioned between the base and the sensor;

a first subset of the third electrical contacts is located on the first side of the wireless module and configured to form one or more first electrical connections with the one or more first electrical contacts; and a second subset of the third electrical contacts is located on the second side of the wireless module and configured to form one or more second electrical connections with the one or more second electrical contacts.

20. The method of claim 16, wherein:

the wireless module has a first side and a second side and multiple third electrical contacts;

the first side is adjacent to the sensor and the second side is adjacent to the base when the wireless module is positioned between the base and the sensor;

a first subset of the third electrical contacts is located on the first side of the wireless module and configured to form one or more first electrical connections with the one or more first electrical contacts; and a second subset of the third electrical contacts is located on the second side of the wireless module and configured to form one or more second electrical connections with the one or more second electrical contacts.

* * * * *